(12) United States Patent
Tsai et al.

(10) Patent No.: US 7,483,265 B2
(45) Date of Patent: Jan. 27, 2009

(54) PORTABLE ELECTRONIC APPARATUS AND WITHDRAWER FOR THE SAME

(75) Inventors: Chih-Sheng Tsai, Taipei (TW); Lun-Wei Kang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 276 days.

(21) Appl. No.: 11/551,730

(22) Filed: Oct. 23, 2006

(65) Prior Publication Data

US 2007/0125139 A1     Jun. 7, 2007

(30) Foreign Application Priority Data

Dec. 6, 2005    (TW) .................................. 94142910

(51) Int. Cl.
*G06F 1/16* (2006.01)
(52) U.S. Cl. .......................................... 361/683; 70/58
(58) Field of Classification Search ................. 361/683, 361/679
See application file for complete search history.

(56) References Cited

U.S. PATENT DOCUMENTS

| | | | | |
|---|---|---|---|---|
| 4,941,841 A | * | 7/1990 | Darden et al. ............... | 361/685 |
| 5,446,618 A | * | 8/1995 | Tetsuya et al. .............. | 361/683 |
| 5,757,616 A | * | 5/1998 | May et al. ................... | 361/683 |
| 5,987,937 A | * | 11/1999 | Lee .............................. | 70/14 |
| 6,785,141 B2 | * | 8/2004 | Fang .......................... | 361/727 |
| 7,009,836 B2 | * | 3/2006 | Lo .............................. | 361/683 |
| 7,009,837 B2 | * | 3/2006 | Lo .............................. | 361/683 |

* cited by examiner

*Primary Examiner*—Lisa Lea-Edmonds
(74) *Attorney, Agent, or Firm*—Jianq Chyun IP Office

(57) ABSTRACT

A portable electronic apparatus including a base, a screen and a withdrawer is provided. The screen is pivotally connected to the base and the withdrawer is adopted for assembling to the base. The withdrawer includes a case, a combination lock and a push rod. The case, on which the combination lock is disposed, has an opening for exposing a part of the combination lock. The push rod disposed on the case has a first and a second end, wherein the second end is connected with the combination lock. When the combination lock is locked, the first end of the push rod penetrates through the base so as to fix the relative position between the case and the base; and when the combination lock is unlocked, the first end of the push rod can be withdrawn back into the case to separate the case from the base.

10 Claims, 6 Drawing Sheets

PORTABLE ELECTRONIC APPARATUS AND WITHDRAWER FOR THE SAME

CROSS-REFERENCE TO RELATED APPLICATION

This application claims the priority benefit of Taiwan application serial no. 94142910, filed Dec. 6, 2005. All disclosure of the Taiwan application is incorporated herein by reference.

BACKGROUND OF THE INVENTION

1. Field of the Invention

The present invention relates to an electronic apparatus. More particularly, the present invention relates to a portable electronic apparatus secured to a withdrawer for protecting the portable electronic apparatus from theft.

2. Description of Related Art

Nowadays, the information technology is highly developed, and many portable electronic apparatuses are equipped with portable information storage media. For example, laptop computers are used to carry important business or personal data. However, there is no effective method of protecting the data storage devices in laptop computers, for example, hard disk, CD-ROM, memory, from theft.

FIG. 1 illustrates a conventional method for protecting laptop computers from theft. Referring to FIG. 1, the laptop computer 10 includes a base 110, a screen 120, a fastener 130 and an electronic apparatus 140. The screen 120 and the base 110 are pivotally connected, and the electronic apparatus 140 is assembled to the base 110. The screen 120 is used for displaying image, and the base 110 is used for installing various data processing and data recording devices. The fastener 130 is suitable for fastening to the base 110 to lock the portable electronic apparatus 10 to a particular position (as the bottom right corner in FIG. 1). In addition, the electronic apparatus 140 may be a CD-ROM or a hard disk. Thus, the entire laptop computer 10 may be locked to a particular position with a fastener 130. Even though this method may be effective in preventing the main body of the computer from being stolen, the hardware storing important data are not protected at all. Thus, the electronic devices installed in laptop computers still lack protection against theft.

SUMMARY OF THE INVENTION

Accordingly, the present invention is directed to a portable electronic apparatus having a withdrawer with theft-prevention function for protecting from theft.

According to an aspect of the present invention, a theft-prevention withdrawer suitable for assembling to carrying electronic apparatuses is provided.

In accordance with the aforementioned objectives and other objectives of the present invention, a portable electronic apparatus including a base, a screen and a withdrawer. The screen is pivotally connected the base, and the withdrawer is suitable for being assembled with the base. The withdrawer includes a case, a combination lock and a push rod. The case, on which the combination lock is disposed, has a first opening for exposing a part of the combination lock. The push rod disposed on the case has a first end and a second end, wherein the second end is connected with the combination lock. When the combination lock is locked, the first end of the push rod penetrates through the base so as to fix the relative position between the case and the base; and when the combination lock is unlocked, the first end of the push rod can be withdrawn back into the case to separate the case from the base.

According to an embodiment of the present invention, the base has a first through hole, and the first end of the push rod is suitable for penetrating through the first through hole to fix the relative position between the case and the base.

According to an embodiment of the present invention, the case has a second through hole, and the push rod penetrates through the second through hole.

According to an embodiment of the present invention, the push rod has a push button, and the case has a second opening for exposing the push button.

According to an embodiment of the present invention, the portable electronic apparatus further includes an electronic apparatus disposed in the case. In addition, the electronic apparatus may be a CD-ROM or a hard disk.

According to another aspect of the present invention, the withdrawer suitable for assembling to a base of an electronic apparatus is provided. The withdrawer includes a case, a combination lock, and a push rod. The case, on which the combination lock is disposed, has a first opening for exposing a part of the combination lock. The push rod disposed on the case has a first end and a second end, wherein the second end is connected with the combination lock. When the combination lock is locked, the first end of the push rod penetrates through the base to fix the relative position between the case and the base; and when the combination lock is unlocked, the first end of the push rod can be withdrawn back into the case to separate the case from the base.

According to an embodiment of the present invention, the base has a first through hole, and the first end of the push rod is suitable for penetrating through the first through hole to fix the relative position between the case and the base.

According to an embodiment of the present invention, the case has a second through hole, and the push rod penetrates through the second through hole.

According to an embodiment of the present invention, the push rod has a push button, and the case has a second opening for exposing the push button.

As described above, in the present invention, a combination lock and a push rod are disposed in the withdrawer so that the electronic apparatuses carried by the withdrawer can be prevented from being stolen by locking the withdrawer to the base of the portable electronic apparatus.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
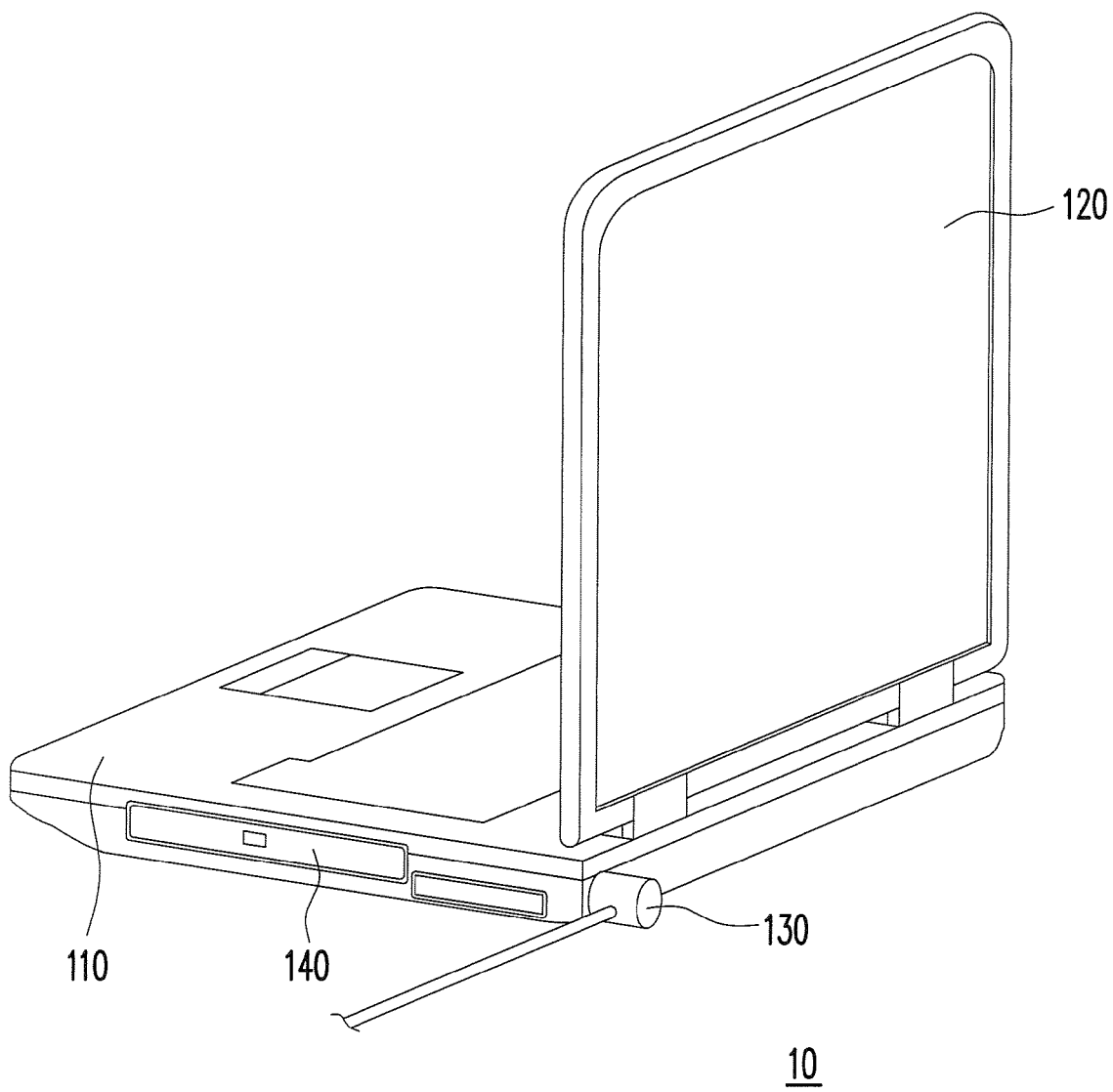
FIG. 1 illustrates a conventional method for protecting laptop computers from theft.
Figure 2:
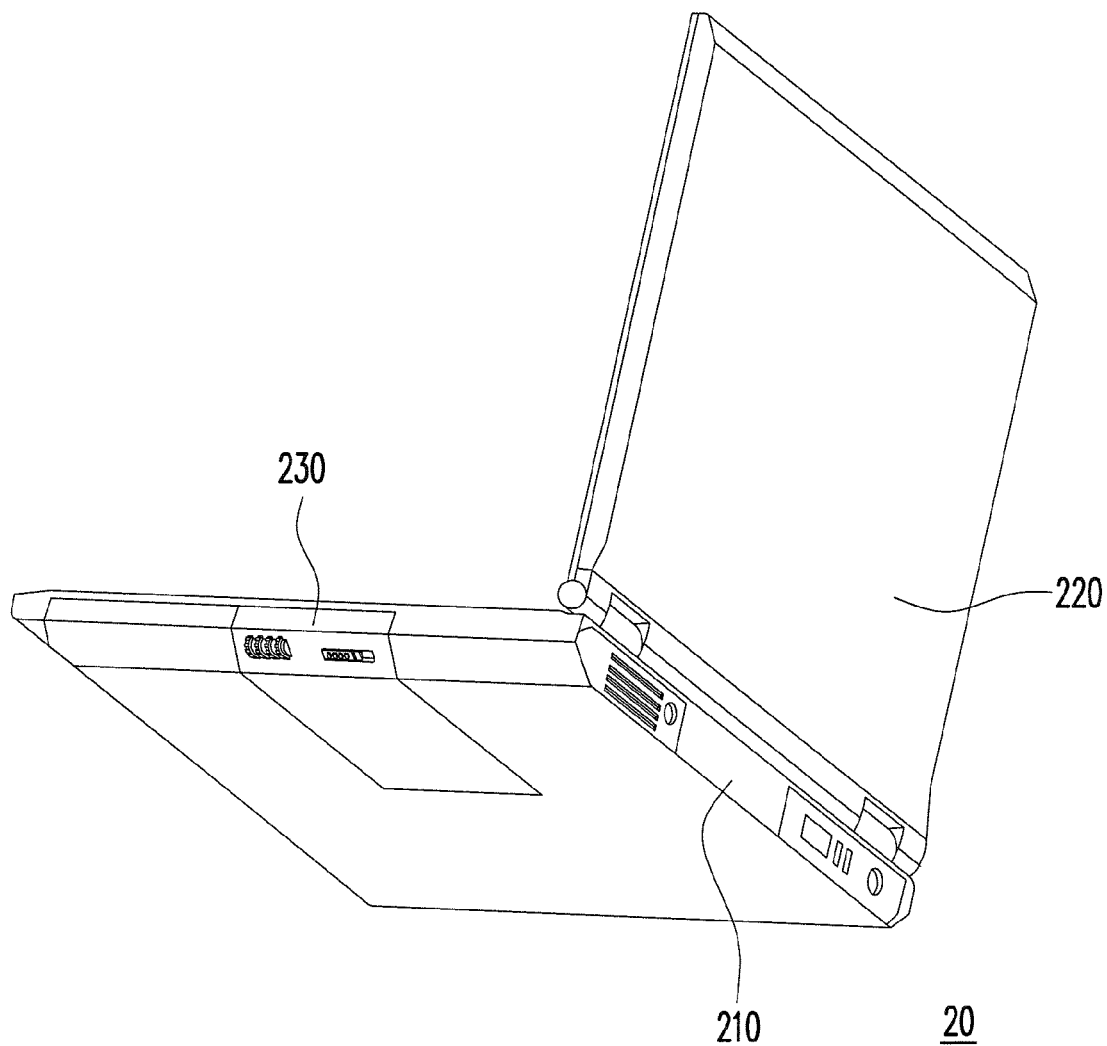
FIG. 2 is a perspective view of a portable electronic apparatus according to an embodiment of the present invention.
Figure 3:
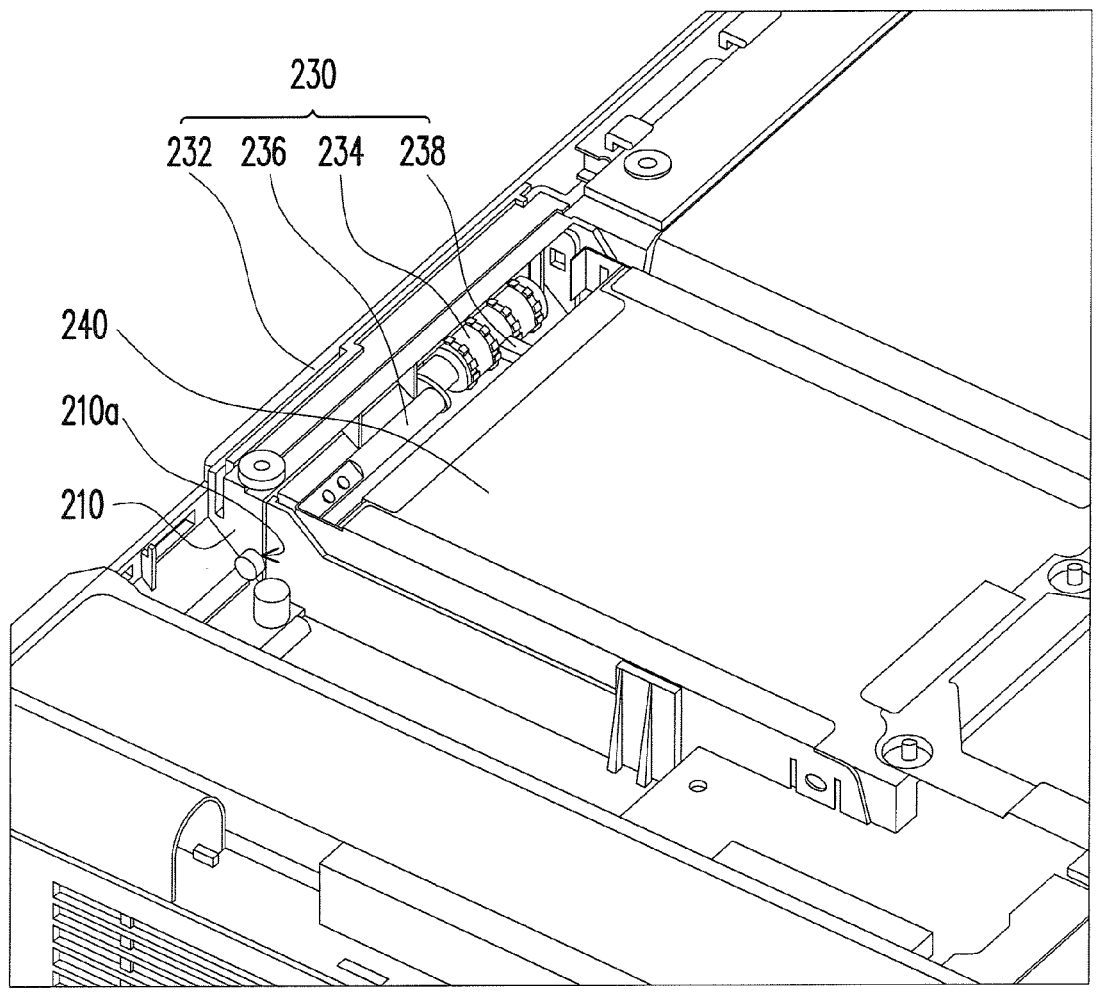
FIG. 3 is a partial perspective view of a portable electronic apparatus according to an embodiment of the present invention.
Figure 4:
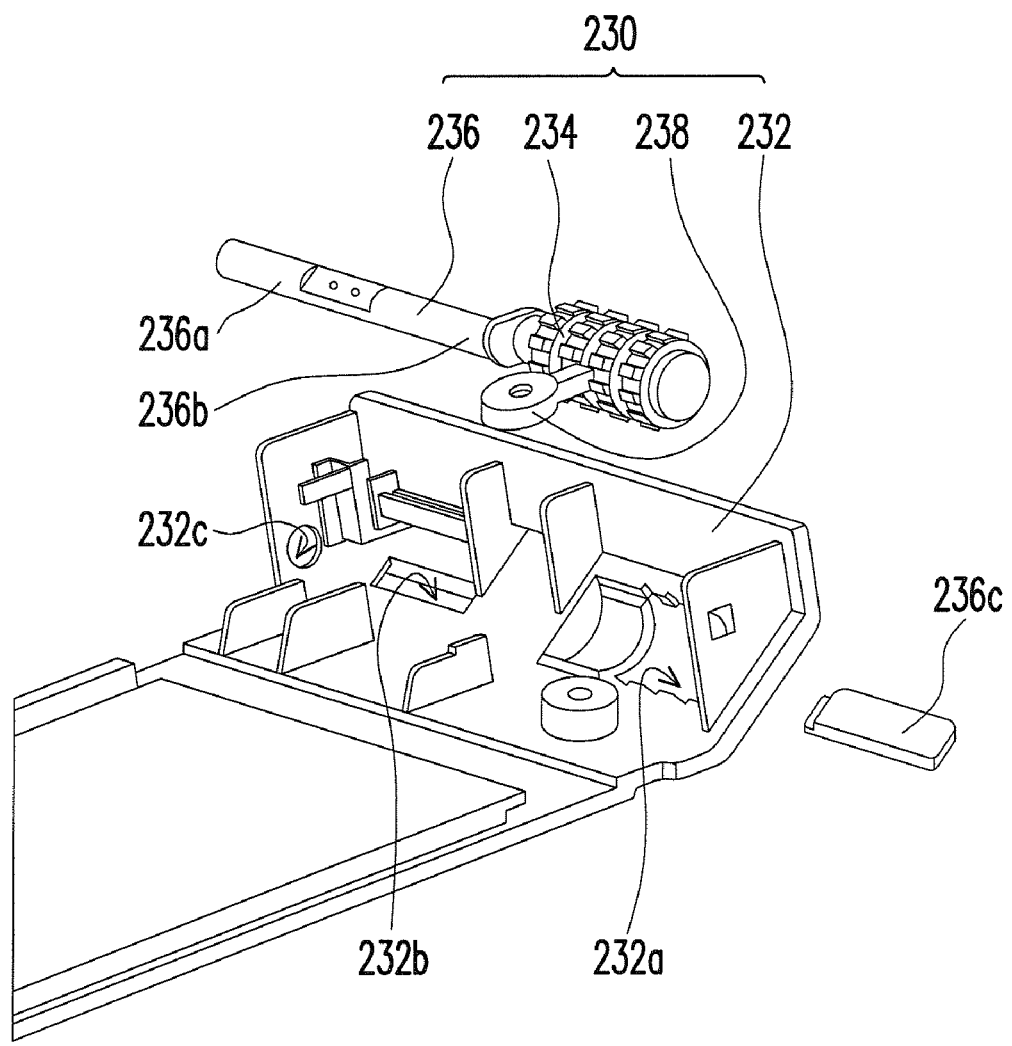
FIG. 4 is an exploded view of the withdrawer in FIG. 3.

FIG. 2 is a perspective view of a portable electronic apparatus according to an embodiment of the present invention, and FIG. 3 is a partial perspective view of a portable electronic apparatus according to an embodiment of the present invention. FIG. 4 is a disassembly view of the withdrawer in FIG. 3. Referring to FIG. 2, the portable electronic apparatus 20 includes a base 210, a screen 220, a withdrawer 230 and an electronic apparatus 240, wherein the electronic apparatus 240 is located in the withdrawer 230, as shown in FIG. 3. The screen 220 is pivotally connected to the base 210, and the withdrawer 230 is assembled to the base 210. The electronic apparatus 240 is disposed in the withdrawer 230. The screen 220 is used for displaying the image, and the base 210 is used for receiving data processing and recording devices. In addition, in the present embodiment, the electronic apparatus 240 disposed in the case 232 of the withdrawer 230 may be a CD-ROM, a hard disk, or other electronic devices.

Next, referring to both FIGS. 3 and 4, the withdrawer 230 includes a case 232, a combination lock 234, a push rod 236 and a combination lock fastener 238. Wherein the combination lock 234, the push rod 236, and the combination lock fastener 238 are disposed on the case 232. The push rod 236 has a first end 236a, a second end 236b and a push button 236c, and the second end 236b thereof is connected to the combination lock 234. The case 232 has a first opening 232a, a second opening 232b and a second through hole 232c, wherein the first opening 232a and the second opening 232b are respectively used for exposing the combination lock 234 and the push button 236c, so that the user can operate the combination lock 234 and the push button 236c while the withdrawer 230 is assembled on the base 210. An electronic apparatus 240 is disposed in the case 232 (as shown in FIG. 3). The combination lock fastener 238 is suitable for fastening the combination lock 234 on the case 232, and the combination lock 234 can be fastened on the case 232 with screws or adhesives. Moreover, the foregoing base 210 has a first through hole 210a, and the first end 236a of the push rod 236 penetrates through the first through hole 210a to fix the relative position between the case 232 and the base 210, at the same time, the first end 236a penetrates through the second through hole 232c of the case 232. Furthermore, when the combination lock 234 is locked, the first end 236a of the push rod 236 penetrates through the first through hole 210a of the base 210 to fix the relative position between the case 232 and the base 210, and when the combination lock 234 is unlocked, the first end 236a of the push rod 236 can be withdrawn back into the case 232 to separate the case 232 and the base 210.

As described above, the withdrawer 230 can be disassembled from the portable electronic apparatus 20 to take out or replace the electronic apparatus 240. Moreover, the withdrawer 230 can be locked in the portable electronic apparatus 20 when used outdoors (for example, in public), so as to protect the electronic apparatus 240 from theft. Below the theft-protection function of the portable electronic apparatus 20 will be explained in detail in reference with accompany drawings.

Figure 5A:
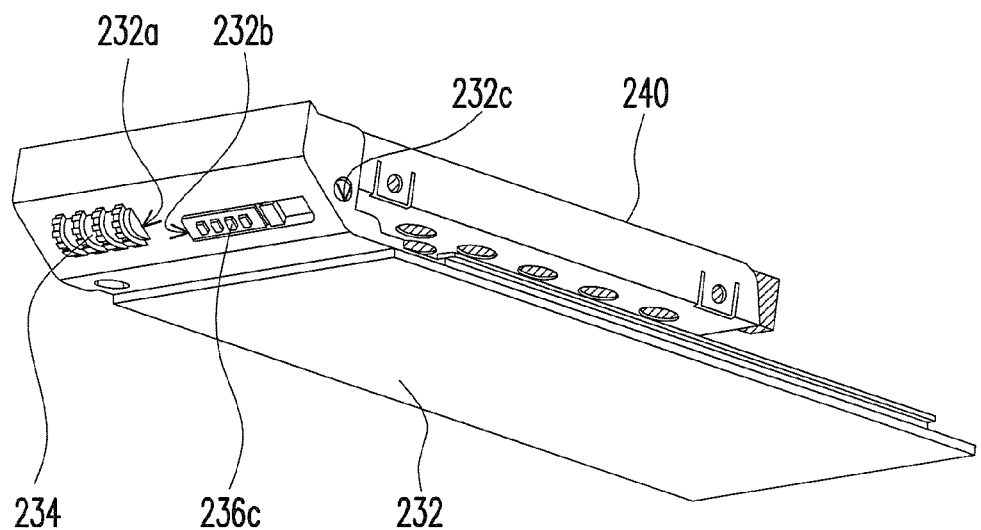
FIGS. 5A and 5B are respectively a front view and a top view of a withdrawer while the combination lock is unlocked.
Figure 5B:
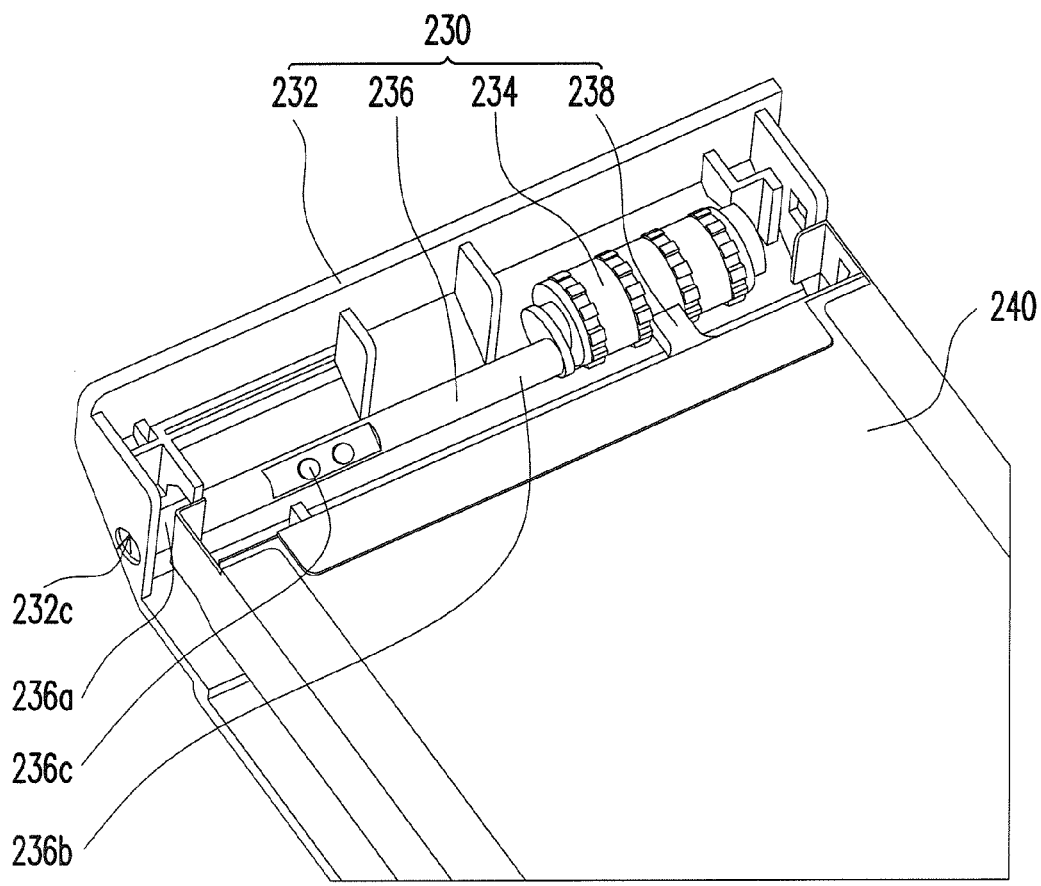
Figure 5C:
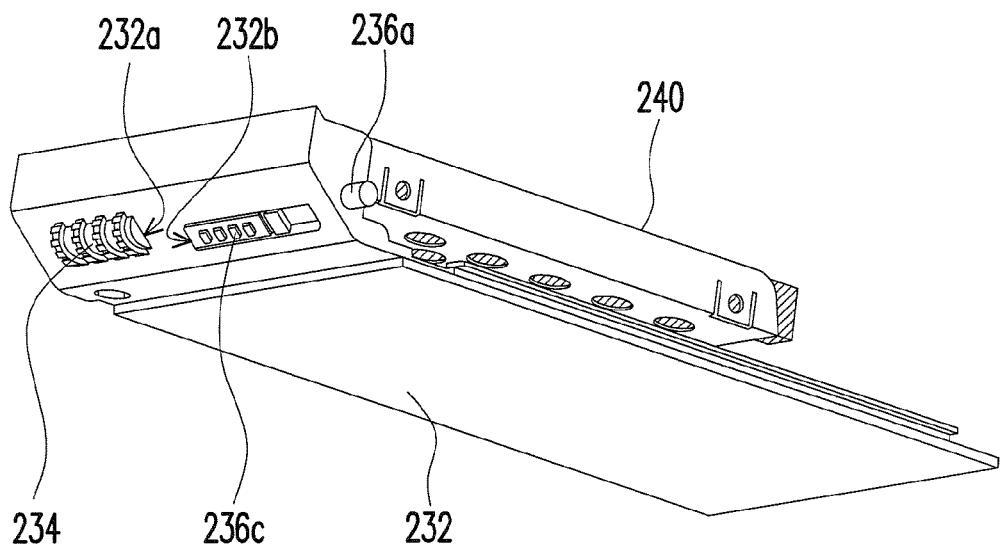
FIGS. 5C and 5D are respectively the front view and the top view of a withdrawer while the combination lock is locked.
Figure 5D:
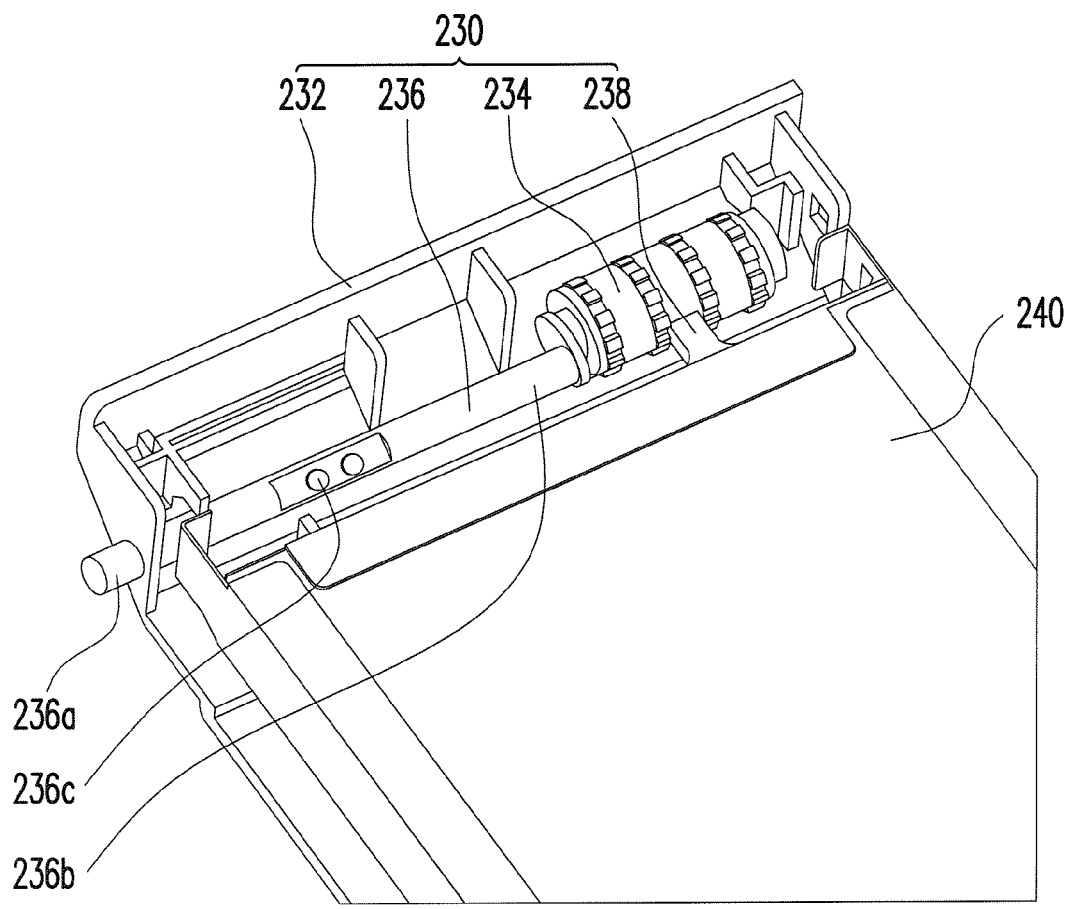

FIGS. 5A and 5B are respectively the front view and the top view of a withdrawer when the combination lock is unlocked, and FIGS. 5C and 5D are respectively the front view and the top view of a withdrawer when the combination lock is locked. As shown in FIGS. 5A and 5B, the first opening 232a of the case 232 exposes the combination lock 234, and the second opening 232b thereof exposes the push button 236c of the push rod 236. The electronic apparatus 240 is, for example, a CD-ROM, a hard disk, or other electronic apparatus. Wherein, when the combination lock 234 is unlocked, the push button 236c is pushed to the bottom left side of the second opening 232b, and as shown in FIG. 5B, the push rod 236 withdraws back into the case 232 and does not penetrate through the second through hole 232c of the case 232 and the first through hole 210a of the base 210. Thus, the push rod 236 doesn't fix the case 232 and the base 210. Accordingly, the withdrawer 230 can be withdrawn from the portable electronic apparatus 20. Next, referring to FIGS. 5C and 5D, as shown in FIG. 5D, after the push button 236c is pushed to the bottom right side of the second opening 232b, the combination lock 234 can be set to lock the withdrawer 230 on the portable electronic apparatus 20. Here, the push rod 236 penetrates through the second through hole 232c of the case 232 and the first through hole 210a of the base 210 (as shown in FIG. 3). Thus, the relative position between the case 232 and the base 210 is fixed, and the withdrawer 230 is locked on the base 210 of the portable electronic apparatus 20 by the push rod 236 penetrating through the second through hole 232c and the first through hole 210a.

As described above, when the combination lock 234 is locked, the withdrawer 230 can be locked in the portable electronic apparatus 20 to secure the portable electronic apparatus 20 from theft. On the other hand, when the combination lock 234 is unlocked, the withdrawer 230 can be withdrawn so that the electronic apparatus 240 can be removed or the electronic devices of the electronic apparatus 20 may replaced or removed.

According to embodiments of the present invention, the withdrawer of the portable electronic apparatus can be used for installing or replacing required electronic apparatuses as well as providing protection to prevent the electronic apparatus from theft.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic apparatus, comprising:
   a base;
   a screen, pivotally to the base;
   a withdrawer, for assembling to the base, the withdrawer comprising:
      a case, having a first opening;
      a combination lock, disposed on the case, the first opening exposing a part of the combination lock; and
      a push rod, disposed on the case, having a first end and a second end, the second end being connected with the combination lock, wherein when the combination lock is locked, the first end of the push rod penetrates through the base to fix the relative position between the case and the base, and when the combination lock is unlocked, the first end of the push rod can be withdrawn back into the case to separate the case and the base.

2. The portable electronic apparatus as claimed in claim 1, wherein the base has a first through hole, and the first end of the push rod is adopted for penetrating through the first through hole to fix the relative position between the case and the base.

3. The portable electronic apparatus as claimed in claim 1, wherein the case has a second through hole and the push rod penetrates through the second through hole.

4. The portable electronic apparatus as claimed in claim 1, wherein the push rod has a push button, and the case has a second opening for exposing the push button.

5. The portable electronic apparatus as claimed in claim 1, further comprising an electronic apparatus disposed in the case.

6. The portable electronic apparatus as claimed in claim 5, wherein the electronic apparatus includes CD-ROM or hard disk.

7. A withdrawer, suitable for carrying an electronic apparatus, being assembled with a base of a portable electronic apparatus, the withdrawer comprising:
   a case, having a first opening;
   a combination lock, disposed on the case, the first opening exposing a part of the combination lock; and
   a push rod, disposed on the case, having a first end and a second end, the second end being connected with the combination lock, wherein when the combination lock is locked, the first end of the push rod penetrates through the base to fix the relative position between the case and the base, and when the combination lock is unlocked, the first end of the push rod can be withdrawn back into the case to separate the case and the base.

8. The withdrawer as claimed in claim 7, wherein the base has a first through hole, and the first end of the push rod penetrates through the first through hole to fix the relative position between the case and the base.

9. The withdrawer as claimed in claim 7, wherein the case has a second through hole, and the push rod penetrates through the second through hole.

10. The withdrawer as claimed in claim 7, wherein the push rod has a push button, and the case has a second opening for exposing the push button.

* * * * *